(12) United States Patent
Nakayama et al.

(10) Patent No.: US 8,114,534 B2
(45) Date of Patent: Feb. 14, 2012

(54) FUEL CELL SYSTEM

(75) Inventors: Ken Nakayama, Yokohama (JP);
Akihiro Sakakida, Yokosuka (JP);
Hiroshi Tanaka, Yokosuka (JP); Junichi Hasegawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 12/967,369

(22) Filed: Dec. 14, 2010

(65) Prior Publication Data

US 2011/0081584 A1 Apr. 7, 2011

Related U.S. Application Data

(63) Continuation of application No. 11/996,083, filed as application No. PCT/IB2006/001992 on Jul. 20, 2006, now Pat. No. 7,875,377.

(30) Foreign Application Priority Data

Jul. 21, 2005 (JP) ................................. 2005-211739
Jan. 20, 2006 (JP) ................................. 2006-011951

(51) Int. Cl.
*H01M 2/00* (2006.01)
*H01M 10/50* (2006.01)
*H01M 2/12* (2006.01)
*H01M 8/00* (2006.01)
*H01M 8/04* (2006.01)

(52) U.S. Cl. .............. 429/61; 429/53; 429/62; 429/400; 429/443

(58) Field of Classification Search ........................ None
See application file for complete search history.

(56) References Cited

U.S. PATENT DOCUMENTS

| 6,363,731 | B1 | 4/2002 | Konrad et al. |
| 6,981,877 | B2 | 1/2006 | Ren et al. |
| 2005/0142400 | A1 | 6/2005 | Turco et al. |
| 2006/0110640 | A1 | 5/2006 | Yoshida et al. |
| 2007/0011251 | A1 | 1/2007 | McNamara et al. |

FOREIGN PATENT DOCUMENTS

| DE | 101 52 311 A1 | 5/2003 |
| JP | 2000-090954 | 3/2000 |
| JP | 2000-357529 | 12/2000 |
| JP | 2003-123805 | 4/2003 |
| JP | 2005-183020 | 7/2005 |

*Primary Examiner* — Emily Le
*Assistant Examiner* — Sarah A Slifka
(74) *Attorney, Agent, or Firm* — Young Basile

(57) ABSTRACT

A fuel cell system is described that enables discharge of moisture generated by the fuel cell system based on pressure differences between components of the fuel cell system. The fuel cell system includes a fuel cell that discharges oxidant offgas via a cathode discharge pipe and discharges fuel offgas and moisture to an anode drain opening that in turn discharges the fuel offgas and the moisture to a gas-liquid separator via an anode drainpipe. A throttle valve establishes a pressure difference downstream within the anode drainpipe to enable movement of the fuel offgas and the moisture from the anode drain opening to a lower pressure area of the gas-liquid separator. In addition, the pressure difference enables the fuel offgas to flow from the gas-liquid separator to the cathode discharge pipe through the throttle valve.

20 Claims, 11 Drawing Sheets

| TRANSFER PRESSURE (ANODE SERIES PRESSURE) | HIGH | | | | LOW | | | |
|---|---|---|---|---|---|---|---|---|
| FUEL CELL TEMP. | HIGH | | LOW | | HIGH | | LOW | |
| GENERATED CURRENT | LARGE | SMALL | LARGE | SMALL | LARGE | SMALL | LARGE | SMALL |
| 1ST BLOCKING VALVE (SURFACE AREA: LARGE) | OPEN | CLOSE | OPEN | CLOSE | OPEN | OPEN | OPEN | OPEN |
| 2ND BLOCKING VALVE (SURFACE AREA: SMALL) | CLOSE | OPEN | CLOSE | OPEN | OPEN | CLOSE | OPEN | CLOSE |

FIG. 4

| TRANSFER PRESSURE (ANODE SERIES PRESSURE) | HIGH | | | | LOW | | | |
|---|---|---|---|---|---|---|---|---|
| FUEL CELL TEMP. | HIGH | | LOW | | HIGH | | LOW | |
| GENERATED CURRENT | LARGE | SMALL | LARGE | SMALL | LARGE | SMALL | LARGE | SMALL |
| 1ST BLOCKING VALVE (SURFACE AREA: LARGE) | OPEN | CLOSE | CLOSE | CLOSE | OPEN | CLOSE | CLOSE | OPEN |
| 2ND BLOCKING VALVE (SURFACE AREA: MEDIUM) | CLOSE | OPEN | OPEN | CLOSE | CLOSE | OPEN | OPEN | CLOSE |
| 3RD BLOCKING VALVE (SURFACE AREA: SMALL) | CLOSE | CLOSE | CLOSE | OPEN | OPEN | OPEN | OPEN | CLOSE |

FIG. 6

FUEL CELL SYSTEM

This application is a continuation of U.S. patent application Ser. No. 11/996,083, filed Jan. 18, 2008, which claims priority to Japanese Patent Application No. 2005-211739, filed Jul. 21, 2005, and Japanese Patent Application No. 2006-011951, filed Jan. 20, 2006, the entire content of each being incorporated herein by reference.

TECHNICAL FIELD

This invention is related to a fuel cell system and, more particularly, to discharge of moisture within a fuel cell system.

BACKGROUND

A conventional fuel cell system may be constructed such that a fuel cell is positioned at the base of the system and offgas and moisture are discharged from the fuel cell to a gas-liquid separator that recovers the moisture from the fuel cell. In this case, it is necessary to discharge the moisture separated using the gas-liquid separator outside of the fuel cell system. However, due to the placement of the fuel cell at the base of the fuel cell system, the fuel cell system may have to use a pump, or a similar device, to move the offgas and the moisture, which includes liquid water, from the fuel cell to the gas-liquid separator. The use of a pump, or similar device, invites defects through the enlargement of the construction size and complications of fuel cell system. In addition, a pump, or similar device, to move the offgas and the moisture between components of the fuel cell system may require a power supply.

SUMMARY

The invention relates to a fuel cell system that enables discharge of moisture generated by the fuel cell system based on pressure differences between components of the fuel cell system. This invention does not invite enlargements or complications of the construction nor impose any restrictions on the layout of the fuel cell system.

The fuel cell system includes a fuel cell that generates power by an electro-chemical reaction of fuel gas and an oxidant gas. The fuel cell discharges oxidant offgas via a cathode discharge pipe and discharges fuel offgas and moisture to an anode drain opening that in turn discharges the fuel offgas and the moisture to a gas-liquid separator via an anode drainpipe. The gas-liquid separator separates fuel gas components and moisture of the fuel offgas. In addition, a throttle valve establishes a degree of an opening in the flow path of the fuel offgas between the gas-liquid separator and the cathode discharge pipe.

The throttle valve establishes a pressure difference downstream within the anode drainpipe to enable movement of the fuel offgas and the moisture from the anode drain opening to a lower pressure area of the gas-liquid separator. In this way, the invention enables discharging moisture to the outside of the fuel cell system by scooping up the moisture which was generated by the fuel cell according to the pressure difference which was established between the anode drain opening of the fuel cell and the gas-liquid separator.

In addition, the pressure difference enables the fuel offgas to flow from the gas-liquid separator to the cathode discharge pipe through the throttle valve. The throttle valve regulates the opening in the flow path in order to dilute the fuel offgas to an allowable concentration with the cathode offgas within the cathode discharge pipe. In this way, the fuel offgas may be safely released into the atmosphere.

In one embodiment, the invention is directed to a fuel cell system comprising a fuel cell that performs power generation by an electrochemical reaction of a fuel gas and an oxidant gas, a cathode discharge pipe that discharges oxidant offgas generated during power generation from the fuel cell, and an anode drain opening that discharges fuel offgas and moisture generated during power generation from the fuel cell via an anode drainpipe. The fuel cell system also comprises a gas-liquid separator that receives the fuel offgas and the moisture from the anode drain opening via the anode drainpipe, and separates fuel gas components and moisture of the fuel offgas, and a throttle valve established in a flow path of the fuel offgas between the gas-liquid separator and the cathode discharge pipe that restricts a flow rate of the fuel offgas. A pressure difference in the anode drainpipe causes the fuel offgas and the moisture to flow from the anode drain opening to the gas-liquid separator, and the fuel offgas to flow from the gas-liquid separator to the throttle valve.

In another embodiment, the invention is directed to a method comprising performing power generation by an electrochemical reaction of a fuel gas and an oxidant gas within a fuel cell, discharging oxidant offgas generated during power generation from the fuel cell via a cathode discharge pipe, and discharging fuel offgas and moisture generated during power generation from the fuel cell with an anode drain opening via an anode drainpipe. The method further comprises receiving the fuel offgas and the moisture from the anode drain opening via the anode drainpipe, and separating fuel gas components and moisture of the fuel offgas with a gas-liquid separator, and maintaining an opening in a flow path of the fuel offgas between the gas-liquid separator and the cathode discharge pipe with a throttle valve that restricts a flow rate of the fuel offgas. The method also includes establishing a pressure difference in the anode drainpipe that causes the fuel offgas and the moisture to flow from the anode drain opening to the gas-liquid separator, and the fuel offgas to flow from the gas-liquid separator to the throttle valve.

In a further embodiment, the invention is directed to a fuel cell system comprising a fuel cell that performs power generation by an electrochemical reaction of a fuel gas and an oxidant gas, means for discharging fuel offgas and moisture generated during power generation from the fuel cell to a gas-liquid separator via an anode drainpipe, and means for establishing a pressure difference in the anode drainpipe that causes the fuel offgas and the moisture to flow from the anode drain opening to the gas-liquid separator, and the fuel offgas to flow from the gas-liquid separator to the throttle valve.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 illustrates one example of the open/close control of the blocking valve in Embodiment 3.

FIG. 6 illustrates one example of open/close control of the blocking valve in Embodiment 4.

DETAILED DESCRIPTION

Figure 1:
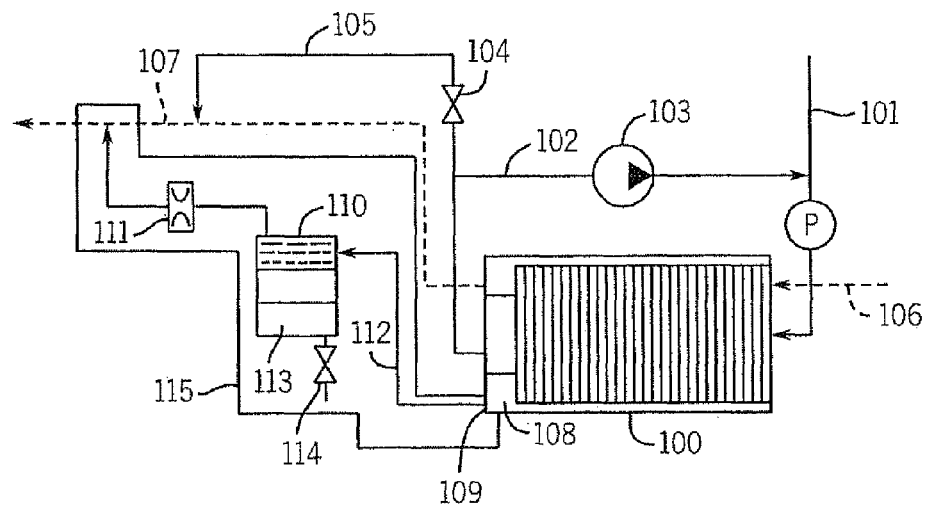
FIG. 1 illustrates the structure of a fuel cell system related to Embodiment 1 of this invention.

FIG. 1 illustrates the construction of a fuel cell system related to Embodiment 1 of this invention. The system of Embodiment 1 shown in FIG. 1 has a fuel cell 100 that performs power generation, a hydrogen supply system for supplying hydrogen or hydrogen rich gas, which is the fuel gas to fuel cell 100, and an air supply system for supplying air that contains oxygen, which is the oxidant gas to fuel cell 100.

Within fuel cell 100, power generation cells, including hydrogen electrodes to which hydrogen is supplied and air electrodes to which oxygen (i.e., air) is supplied, are superimposed by sandwiching and laminating electrolyte-electrode complexes. In addition, fuel cell 100 includes a generation part that produces electrical energy from the chemical energy of the electro-chemical reaction of hydrogen and oxygen.

At the hydrogen electrode of fuel cell 100, the hydrogen separates into hydrogen ions and electrons, the hydrogen ions pass through the electrolyte and the electrons generate power by passing through an external circuit, respectively moving to the air electrode. At the air electrode, the previously described hydrogen ions and electrons react with the oxygen in the air that is supplied, with water being generated and discharged to the outside.

A solid polymer electrolyte for the electrolyte of fuel cell 100 may create a high energy density, low-cost, and lightweight fuel cell system. The solid polymer electrolyte is comprised of a fluoride resin based ion exchange membrane and a polymer membrane capable of conducting ions (i.e., protons), and functions as an ion conducting electrolyte using saturated moisture.

The hydrogen gas supplied from the hydrogen supply source is sent towards the hydrogen supply pipe 101 passing through the hydrogen adjustment valve, and is supplied to the hydrogen electrode of fuel cell 100. At fuel cell 100, when all of the supplied hydrogen gas is not consumed, an anode circulation pump 103 circulates the hydrogen offgas discharged from fuel cell 100 without being consumed by passing the hydrogen offgas through the anode circulation pipe 102. Within the anode circulation pipe 102, the hydrogen offgas mixes with the newly supplied hydrogen gas and is subsequently supplied to the hydrogen electrode of fuel cell 100.

Anode circulation pipe 102 includes a purge valve 104 and a purge pipe 105 on the outlet side of fuel cell 100. Purge valve 104 is normally closed, and is opened if there is a detection of a reduction in cell voltage with the accumulation of clogged water or inactive gas in fuel cell 100. Within anode circulation pipe 102, impurities or nitrogen accumulate from the circulation of the hydrogen gas, and there is a reduction in generating efficiency of fuel cell 100 due to the lowering of hydrogen pressure. The hydrogen is purged from fuel cell 100 and anode circulation pipe 102 by releasing the purge valve 104 as needed.

The air supply system of fuel cell 100 conducts air from an air supply pump to the air electrode by the air supply pipe 106. Any oxygen and cathode offgas that is not consumed by fuel cell 100 is discharged from fuel cell 100 to outside the fuel cell system by the cathode discharge pipe 107.

In addition, the fuel cell system provides an anode water discharge system 115. When fuel cell 100 performs power generation using an oxidation reduction reaction, moisture is generated on the cathode side of fuel cell 100. This moisture moves to the anode side of fuel cell 100 by the electrolyte membrane and is discharged from anode drain opening 109 along with the fuel offgas. Anode water discharge system 115 provides a discharge of this moisture, which includes liquid water and offgas to the outside of the fuel cell system. The fuel cell system also provides a gas-liquid separator 110 and a throttle valve 111 that comprises an orifice.

Gas-liquid separator 110 is placed at a higher position than anode drain opening 109 of anode discharge outlet manifold 108 of fuel cell 100, and connects with anode drain opening 109 of fuel cell 100 by an anode drain pipe 112. Gas-liquid separator 110 includes a water tank 113 that temporarily retains water on a lower part of gas-liquid separator 110, and a discharge water valve 114 that controls discharge of the water retained in the water tank 113 to the outside of the fuel cell system. The gas-liquid separator 110 receives hydrogen offgas and moisture that was generated inside fuel cell 100 from the anode drain opening 109, and separates gas components and moisture from the hydrogen offgas. Gas-liquid separator 110 temporarily retains the separated moisture in the water tank 113 and appropriately discharges the retained water from the water tank 113 by the discharge water valve 114.

The gas-liquid separator 110 is also connected to the cathode discharge pipe 107 that opens into the atmosphere. Throttle valve 111 is established between the gas-liquid separator 110 and the cathode discharge pipe 107. While running the fuel cell system, the pressure in the fuel cell 100 is higher, 10 KPa or more, than the pressure of the atmosphere. Therefore, the offgas and the moisture in the anode drain opening 109 are sucked to the gas-liquid separator 110 by the pressure difference between the connecting point of the gas-liquid separator 110 and the cathode discharge pipe 107 and the anode drain opening 109. The throttle valve 111 works to reduce or restrict the flow rate or flow speed of the offgas and the moisture such that the moisture can be fully separated from gas components in the gas-liquid separator 110. Only gas components that do not include moisture are moved to the cathode discharge pipe 107 via the throttle valve 111, otherwise the discharge pipe 107 may be choked by liquid water. The throttle valve 111 works to prevent moisture from reaching the cathode discharge pipe 107.

In addition, the fuel cell system provides a system control part 120 (not shown in FIG. 1). The system control part 120 functions as a controlling center that controls the operation of the fuel cell system and provides resources, such as a CPU, memory device and input/output devices, for controlling operational processing using programs. The system control part 120 reads the necessary signals for operation of the fuel cell system, such as the pressure, temperature, voltage, and current obtained by sensors (not shown) in this fuel cell system. Based on programs read and preloaded in internal control logic, the system control part 120 sends commands to each component of the fuel cell system and includes moisture exhaust processing for the fuel cell system.

As illustrated in FIG. 1, the throttle valve 111 is positioned between the gas-liquid separator 110 and the cathode discharge pipe 107. Throttle valve 111 is established so that it is possible to maintain a pressure difference more than the sum of the difference in elevation L between the anode drain opening 109 and gas-liquid separator 110 in the anode drain pipe 112. In other words, the throttle valve establishes the following: $L$ (mm)/100 (kPa)+$\Delta Ps$<$\Delta P$ (kPa)=$P2-P1$, where L is the difference in elevation, $\Delta Ps$ is the pressure drop in the anode drain pipe 112, P1 is the pressure within gas-liquid separator 110, and P2 is the pressure within the anode outlet manifold 108.

In embodiment 1, the opening of the throttle valve 111 has a circle diameter of 0.18 mm. The diameter of the opening of the throttle valve 111 is established so as to be able to dilute the hydrogen offgas passing through throttle valve 111 to less than a combustible hydrogen concentration using the cathode offgas within the cathode discharge pipe 107.

Embodiment 1 includes throttle valve 111 that generates a pressure difference in the anode drainpipe 112 between the gas-liquid separator 110 in the anode outlet manifold 108. By using this pressure difference, it becomes possible to scoop up the water generated by the fuel cell 100 and discharged from the anode outlet manifold 108 and the anode drain opening 109 to the gas-liquid separator 110, which is placed at a higher location in the fuel cell system than the anode outlet manifold 108 and the anode drain opening 109.

Between the gas-liquid separator 110 and the anode outlet manifold 108, it is possible to scoop up the water by discharging the fuel offgas due to the pressure difference. The pressure difference is determined based on the difference in elevation and the pipe pressure drop of the anode drainpipe 112. In addition, it becomes possible to dilute the hydrogen offgas passing through the throttle valve 111 by mixing the hydrogen offgas and the cathode discharge gas within the cathode discharge pipe 107.

In this way, the invention enables water discharge processing, improvement in fuel consumption, low-cost, and miniaturization of the fuel cell system without requiring a scooping device that utilizes the power of the pump, a dilution pump, or a discharge hydrogen processing device. In addition, discharging moisture to the outside of the fuel cell system by scooping up the water makes it is possible to prevent flooding of the fuel cell 100, which stabilizes the performance of fuel cell 100.

Figure 2:
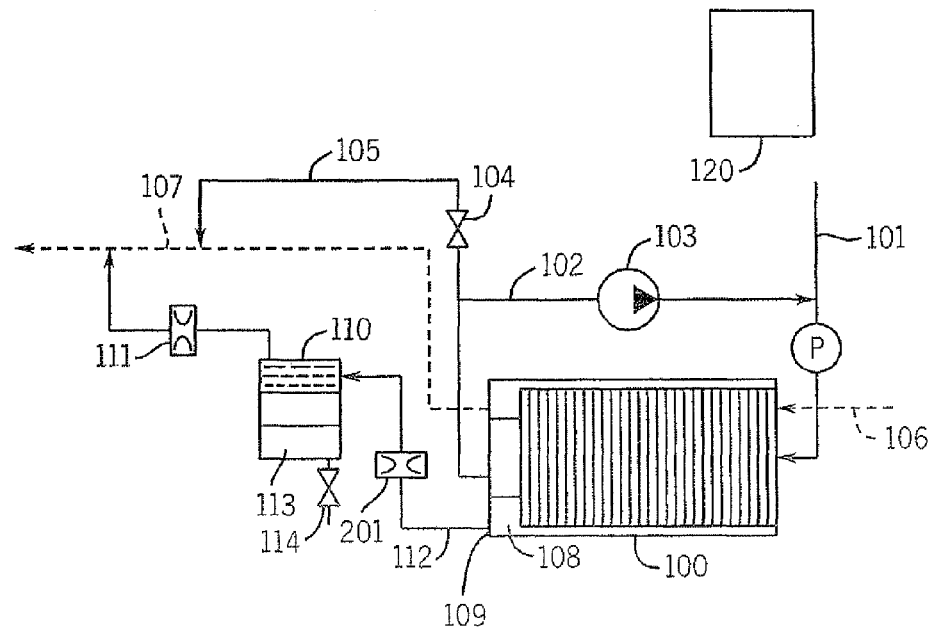
FIG. 2 illustrates the structure of a fuel cell system related to Embodiment 2 of this invention.

FIG. 2 illustrates the structure of the fuel cell system related to Embodiment 2 of this invention. Compared to Embodiment 1, the characteristics of Embodiment 2 shown in FIG. 2 are such that there is established a second throttle valve 201 that comprises an orifice between anode drain opening 109 and gas-liquid separator 110. Second throttle valve 201 has the same function as the first throttle valve 111 in the anode drainpipe 112 between the anode drain opening 109 and a gas-liquid separator 110 of fuel cell 100. Other characteristics of this embodiment are the same as those of Embodiment 1.

In Embodiment 2, it is possible to increase the pressure difference generated between the gas-liquid separator 110 and the anode outlet manifold 108. This increases the ability for scooping up water and improves the performance of the fuel cell system.

Figure 3:
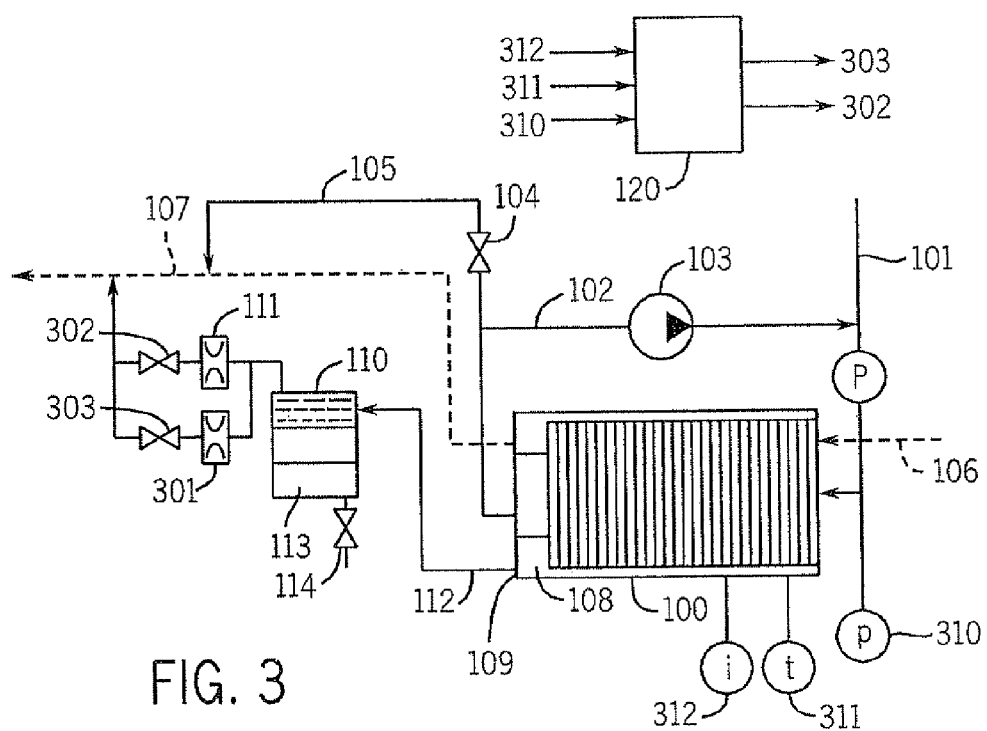
FIG. 3 illustrates the structure of a fuel cell system related to Embodiment 3 of this invention.

FIG. 3 illustrates the structure of the fuel cell system related to Embodiment 3 of this invention. Compared to Embodiment 1, the characteristics of Embodiment 3 shown in FIG. 3 include a third throttle valve 301 that comprises an orifice along another flow path of the hydrogen offgas between gas-liquid separator 110 and the cathode discharge pipe 107. Third throttle valve 301 has the same function as the first throttle valve 111 and is in parallel with first throttle valve 111. Embodiment 3 also includes a first blocking valve 302 and a second blocking valve 303 positioned downstream of the first throttle valve 111 and the third throttle valve 301, respectively. Other characteristics are the same as Embodiment 1.

In the illustrated structure, system control part 120 has open and close control of the first blocking valve 302 and the second blocking valve 303. The open and close control enables the system control part 120 to change the flow path surface area between the gas-liquid separator 110 and the cathode discharge gas pipe 107. The outlet surface area when releasing the hydrogen offgas for the first blocking valve 302 and the second blocking valve 303 are established such that the first blocking valve 302 is greater than the second blocking valve 303. FIG. 4 illustrates one example of the open and close control of the blocking valves in Embodiment 3.

It is possible to change the opening surface area by the open and close control in response to detected operating conditions of the system. The detected operating conditions may include detection of operating pressure within the anode side of the fuel cell system by a pressure sensor 310, detection of the fuel cell temperature using a temperature sensor 311, and detection of the current drawn out from fuel cell 100 using a current sensor 312. The higher the operating pressure, the higher an increase in the amount of moisture and hydrogen offgas discharged from the anode drain opening 109 to the gas-liquid separator 110. The greater the fuel cell temperature, the greater the current extracted from the fuel cell 100. The moisture generated by the fuel cell 100 increases based on these operating conditions; therefore the throttle valve opening diameter and timing for replacement of the blocking valve are determined from calculations of the hydrogen offgas and moisture discharge amount.

In Embodiment 3, it is possible to change the throttle surface area and improve the reliability by preventing flooding of fuel cell 100 by changing the amount of water scooped out in response to the system operating conditions and the hydrogen offgas discharge amount. In addition, it is possible to improve fuel consumption by lowering the amount of hydrogen offgas discharged from fuel cell 100.

Furthermore, the hydrogen discharge amount may be reduced in addition to maintaining the required amount of water to be scooped up, thereby improving fuel consumption. In addition, with open and close control of the throttle valve in response to the water amount generated in fuel cell 100 and the fuel cell temperature, it becomes possible to reduce the water amount that is retained in the anode outlet manifold 108. It is also possible to prevent flooding and to design for an efficient system of nitrogen purging.

Figure 5:
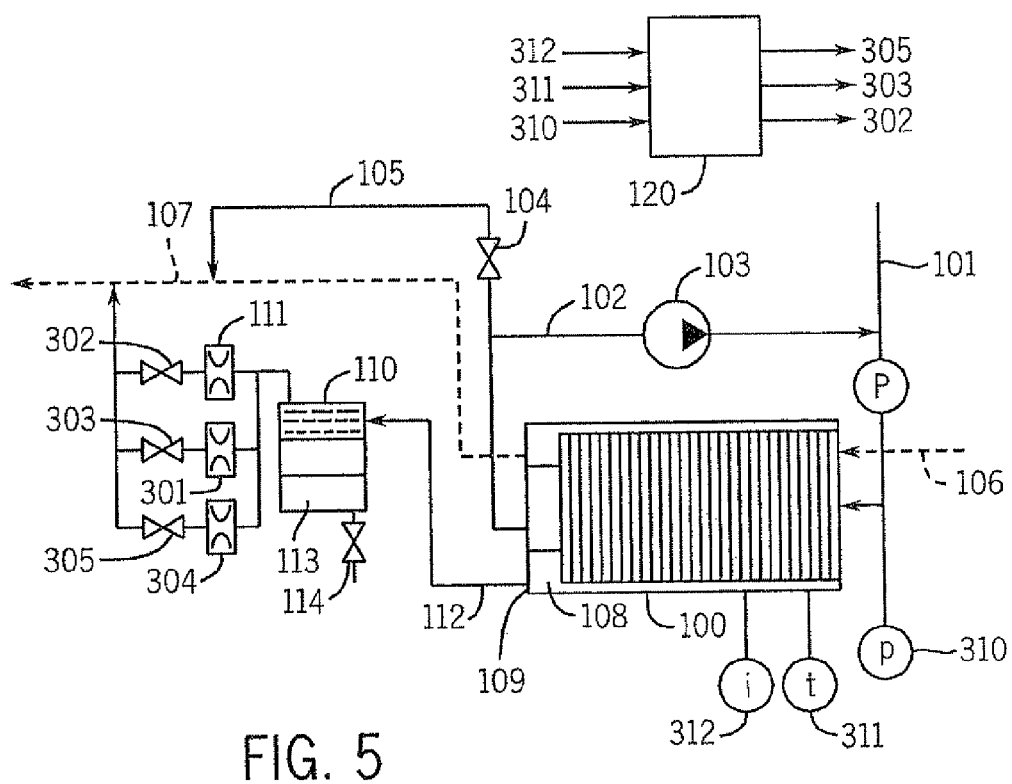
FIG. 5 illustrates the structure of a fuel cell system related to the Embodiment 4 of this invention.

FIG. 5 illustrates the structure of the fuel cell system related to Embodiment 4 of this invention. Compared to Embodiment 3, the characteristics of Embodiment 4 shown in FIG. 5 are such that there is established a fourth throttle valve 304 in parallel with the first throttle valve 111 and the third throttle valve 301, with the establishment of a third blocking valve 305 downstream of the fourth throttle valve 304. Other characteristics are the same as Embodiment 3.

In the illustrated structure, the outlet surface area when releasing the hydrogen offgas for the first blocking valve 302, the second blocking valve 303 and the third blocking valve 305 is established such that the first blocking valve 302 is greater than the second blocking valve 303, which is greater than the third blocking valve 305. FIG. 6 illustrates one example of the open and close control of the blocking valves in Embodiment 4.

Pressure sensor 310 within the fuel cell system detects the operating pressure within the anode side of the fuel cell system, temperature sensor 311 within the fuel cell system detects the fuel cell temperature, and current sensor 312 within the fuel cell system detects the current drawn out from fuel cell 100. It is possible to change the opening surface area by open and close control in response to the detected operating conditions of the fuel cell system.

Consequently, in Embodiment 4, it may be possible to more accurately adjust the opening in the flow path between gas-liquid separator 110 and cathode discharge pipe 107 than with Embodiment 3. It may also be possible to accurately control the amount of water scooped up to gas-liquid separator 110 and the amount of hydrogen discharged from gas-liquid separator 110.

Figure 7:
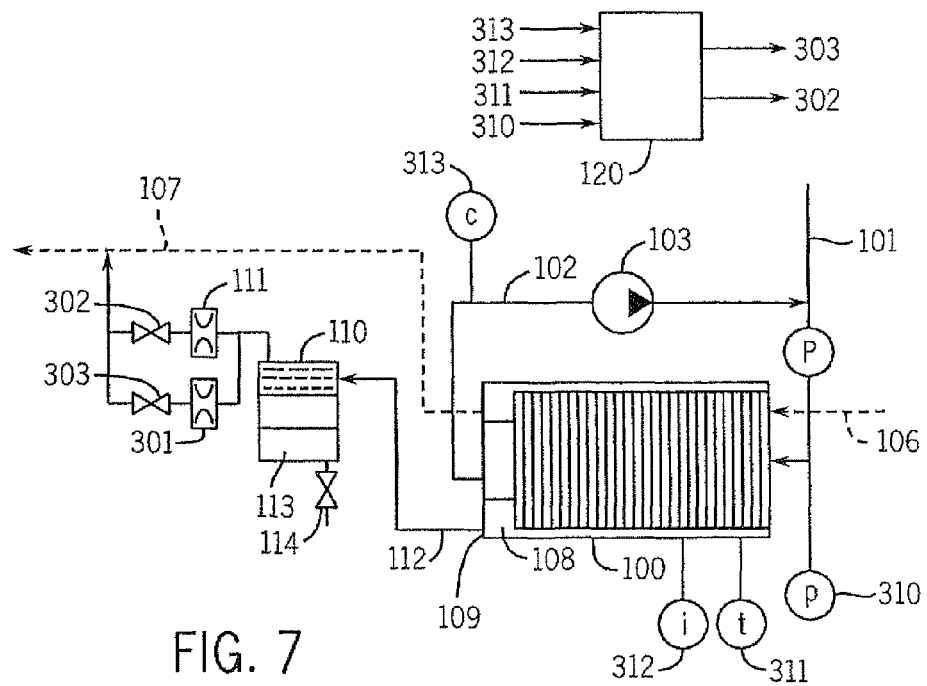
FIG. 7 illustrates the structure of a fuel cell system related to Embodiment 5 of this invention.

FIG. 7 illustrates the structure of the fuel cell system related to Embodiment 5 of this invention. Compared to Embodiment 3, the characteristics of Embodiment 5 shown in FIG. 7 are such that there is elimination of the purge valve 104 in the purge pipe 105 from the anode circulation pipe 102. In this case, there is nitrogen purging on the anode side of the fuel cell system using the anode water discharge system 115. Other characteristics are the same as Embodiment 3.

In the illustrated embodiment, anode water discharge system 115 is formed using anode drain pipe 112, gas-liquid separator 110, first throttle valve 111, first blocking valve 302, third throttle valve 301, second blocking valve 303, and cathode discharge gas pipe 107. The anode water discharge system 115 is capable of purging nitrogen from the anode side of the fuel cell 100 to the cathode discharge gas pipe 107.

In Embodiment 5, it is possible to eliminate the purge valve 104 and the purge pipe 105, thereby reducing the size of the structure and reducing the cost. In response to the required nitrogen purge amount for the anode side of the fuel cell system, changing the flow surface area with open and close control of the first throttle valve 111 and the third throttle valve 301 enables scooping up the water while satisfying the required nitrogen purge amount. It is also possible to improve fuel consumption by preventing excessive hydrogen discharge. Moreover, the required nitrogen purge amount may be estimated from the hydrogen concentration detected by the hydrogen concentration sensor 313 within the anode circulation pipe 102.

Figure 8:
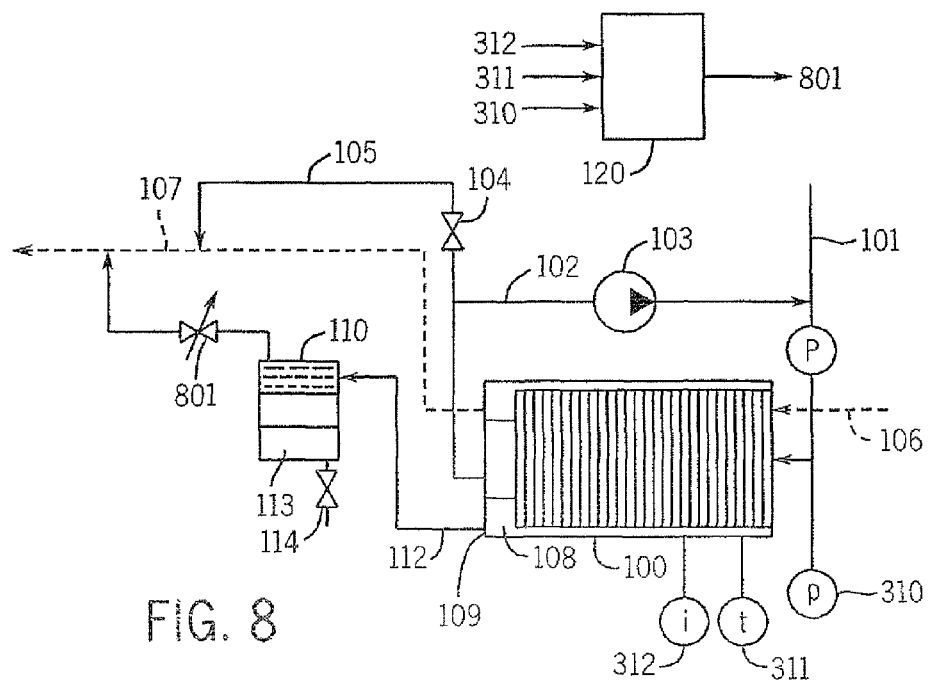
FIG. 8 illustrates the construction of a fuel cell system related to Embodiment 6 of this invention.

FIG. 8 illustrates the structure of the fuel cell system related to Embodiment 6 of this invention. Compared to Embodiment 1, the characteristics of Embodiment 6 shown in FIG. 8 are such that there is established a variable throttle valve 801 that replaces the first throttle valve 111, though the other characteristics are the same as Embodiment 1.

The variable throttle valve 801 is established so as to be able to change the opening surface area (i.e., degree of throttle opening) in the flow path between gas-liquid separator 110 and the cathode discharge pipe 107 under the control of the system control part 120. In Embodiment 6, it may be possible to change the pressure difference between the anode outlet manifold 108 and the gas-water separator 110 by using a single throttle valve, thus making it possible to reduce the size of the structure.

In addition, in order to freely establish the pressure difference using the opening surface area of the variable throttle valve 801, there is detection of the operating pressure within the anode side of the fuel cell system using the pressure sensor 310, detection of the fuel cell temperature using the temperature sensor 311, and detection of the current drawn from fuel cell 100 using the current sensor 312. From these measurements, it is possible to determine the pressure difference by altering the opening through variable throttle valve 801 in response to the detected operating conditions. Compared to the adjustments of the opening surface area from the throttle valves shown in Embodiments 1-4, the variable throttle valve 801 enables more accurate adjustment of the amount of water scooped up and the amount of nitrogen discharged from the fuel cell system. In this way, it may also be possible to prevent flooding and improve reliability of the fuel cell 100 and reduce the amount of nitrogen discharge and improve fuel consumption of the fuel cell 100.

Figure 9:
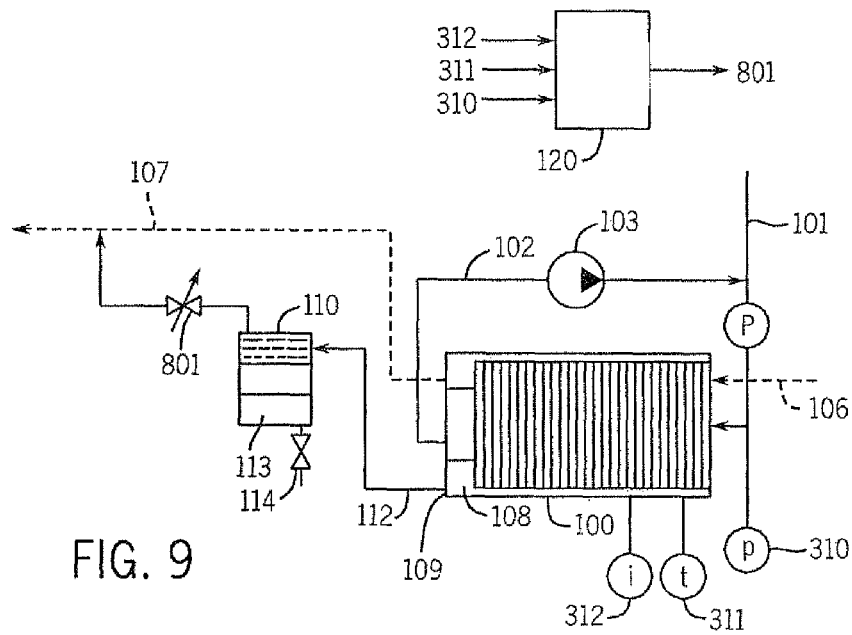
FIG. 9 illustrates the construction of a fuel cell system related to Embodiment 7 of this invention.

FIG. 9 illustrates the structure of a fuel cell system related to Embodiment 7 of this invention. The characteristics of Embodiment 7 shown in FIG. 9 are such that there is adoption of the characteristics of Embodiment 6, and elimination of the purge valve 104 in the purge pipe 105 from the anode circulation pipe 102. Embodiment 7 also purges the nitrogen from the anode side of the fuel cell system using the anode water discharge system 115, but the other characteristics are the same as those of Embodiment 6.

Consequently, Embodiment 7 has the capability of obtaining results that were obtainable in Embodiment 6, and compared to Embodiment 5, it is possible to approximate the required amount of nitrogen actually purged from the fuel cell system very precisely. In addition, by controlling the discharge of useless hydrogen, it is possible to improve fuel consumption.

Figure 10:
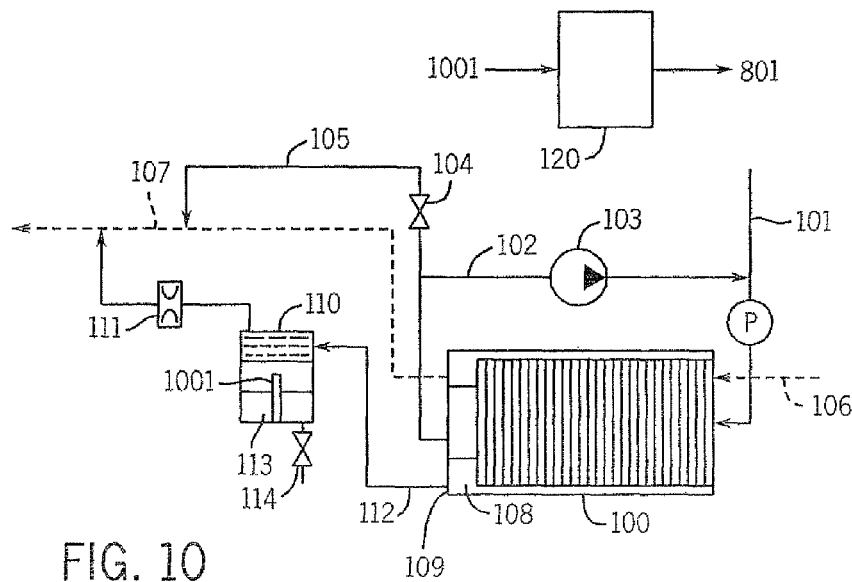
FIG. 10 illustrates the construction of a fuel cell system related to Embodiment 8 of this invention.

FIG. 10 illustrates the structure of the fuel cell system related to Embodiment 8 of this invention. Compared to Embodiment 1, the characteristics of Embodiment 8 shown in FIG. 10 are such that there is established a water level detection gauge 1001 in the water tank 113 of the gas-liquid separator 110. Other characteristics are the same as those in Embodiment 1.

In Embodiment 8, the water level detection gauge 1001 detects the water level within water tank 113 and inputs the detected water level to the system control part 120. By adjusting the water level of the water tank 113 with open and close control of the discharge water valve 114 of the water tank 113 under control of the system control part 120 based on the detected water level, it may be possible to maintain the water level within the water tank 113. It may also be possible to prevent hydrogen leakage when discharging water from the water tank 113 by the discharge water valve 114. In addition, water level detection gauge 1001 may quickly detect a water level reduction in the water tank 113, thus improving reliability.

Figure 11:
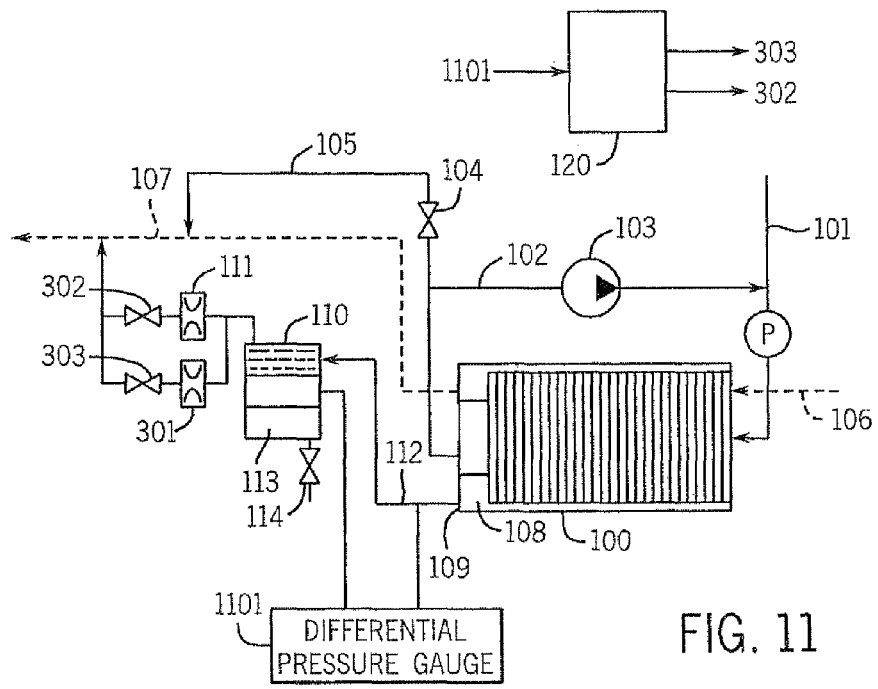
FIG. 11 illustrates the construction of a fuel cell system related to Embodiment 9 of this invention.

FIG. 11 illustrates the structure of the fuel cell system related to Embodiment 9 of this invention. Compared to Embodiment 2, the characteristics of Embodiment 9 shown in FIG. 11 are such that there is established a differential pressure gauge 1101 that detects the pressure difference of both locations between the gas-liquid separator 110 and the anode outlet manifold 108. Other characteristics are the same as those in Embodiment 2.

There is a difference in pressure in the anode drainpipe 112 which connects the anode outlet manifold 108 in the gas-liquid separator 110 when there is water in the anode drainpipe 112 and when there is no water in the anode drainpipe 112. Because the difference in pressure becomes large when there is water in the anode drainpipe 112, the open and close control of the first blocking valve 302 and the second blocking valve 303 is varied based on the pressure difference detected by the differential pressure gauge 1101. When there is water in the anode drainpipe 112, the opening surface area of the first throttle valve 111 and the third throttle valve 301 becomes large and there is an increase in the scooped up amount of water. Therefore, it may be possible to quickly discharge moisture within fuel cell 100. In addition to being able to improve the reliability by preventing flooding, is possible to improve performance by designing for the efficient purging of nitrogen.

Figure 12:
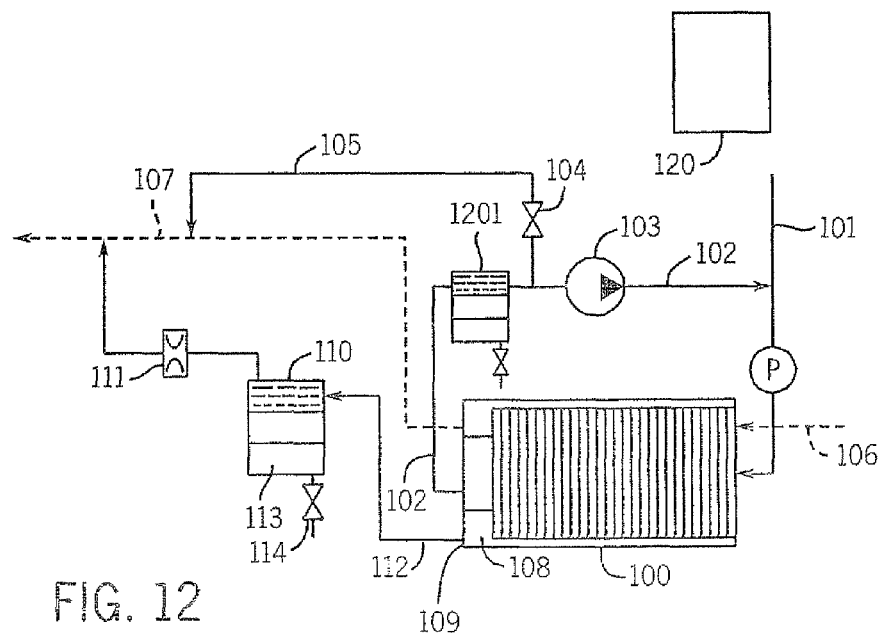
FIG. 12 illustrates the construction of a fuel cell system related to Embodiment 10 of this invention.

FIG. 12 illustrates the structure of the fuel cell system related to Embodiment 10 of this invention. Compared to Embodiment 1, the characteristics of Embodiment 10 shown in FIG. 12 are such that there is established a second gas-liquid separator 1201 that has the same function as the gas-liquid separator 110 established in the anode water discharge system 115 upstream of the branch point of the anode circulating pipe 102 and the purge pipe 105. Other characteristics are the same as those in Embodiment 1.

In Embodiment 10, it is possible to recover the moisture that flows out to the anode circulating pipe 102 using the circulation gas-liquid separator 1201. Therefore, it may be possible to prevent flow of water in the components of the circulating system, such as the anode circulating pump 103, and it may be possible to improve ability and reliability.

Figure 13:
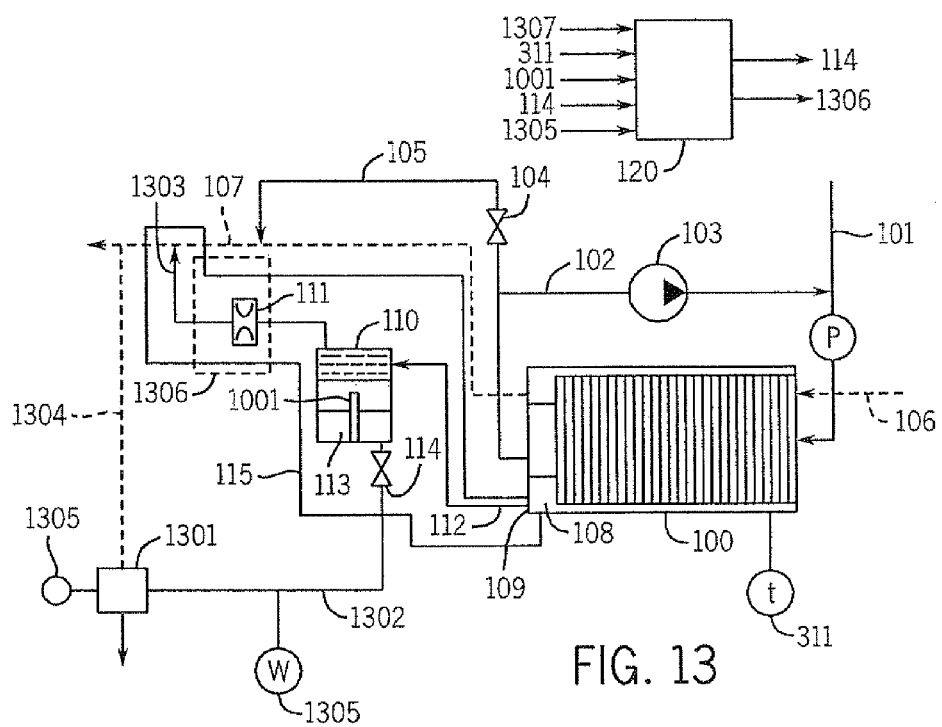
FIG. 13 illustrates the construction of a fuel cell system related to Embodiment 11 of this invention.

FIG. 13 illustrates the structure of the fuel cell system related to Embodiment 11 of this invention. Compared to Embodiment 1, the characteristics of Embodiment 11 shown in FIG. 13 are such that there is established a confluence part 1301 that merges the water discharged from the water tank 113 and the cathode offgas discharged to the cathode discharge pipe 107.

The confluence part 1301 is connected to the discharge water valve 114 that controls discharge of water from the water tank 113 via discharge water pipe 1302. The confluence part 1301 is also connected to the downstream cathode discharge pipe 107 by the connecting part 1303 of the downstream side of the first throttle valve 111 and the cathode discharge pipe 107 via the branch pipe 1304. A hydrogen concentration sensor 1305 detects the hydrogen concentration within the confluence part 1301, and the hydrogen concentration sensor 1305 inputs the detected hydrogen concentration to the system control part 120. The hydrogen concentration sensor 1305 is also called a gas-liquid separation sensor 1305 herein. Other characteristics are the same as those of Embodiment 1.

In the illustrated structure, the water retained in the water tank 113 flows to the confluence part 1301 by the discharge water valve 114, which is open, and the discharge water pipe 1302. At this time, even when there is a leak of hydrogen gas to the discharge water pipe 1302 by the discharge water valve 114 of the water tank 113, the leaked hydrogen gas is diluted by the cathode offgas flowed to the confluence part 1301 by the branch pipe 1304 from the cathode discharge gas pipe 107 and is discharged outside the fuel cell system using the confluence part 1301.

Therefore, it may be possible to safely discharge the hydrogen offgas by diluting the hydrogen gas with the cathode offgas to a concentration less than a specified value. In addition, by detecting the hydrogen concentration within the confluence part 1301 by a hydrogen concentration sensor 1305, it becomes possible to detect leakage of hydrogen gas for the water tank 113.

Figure 14:
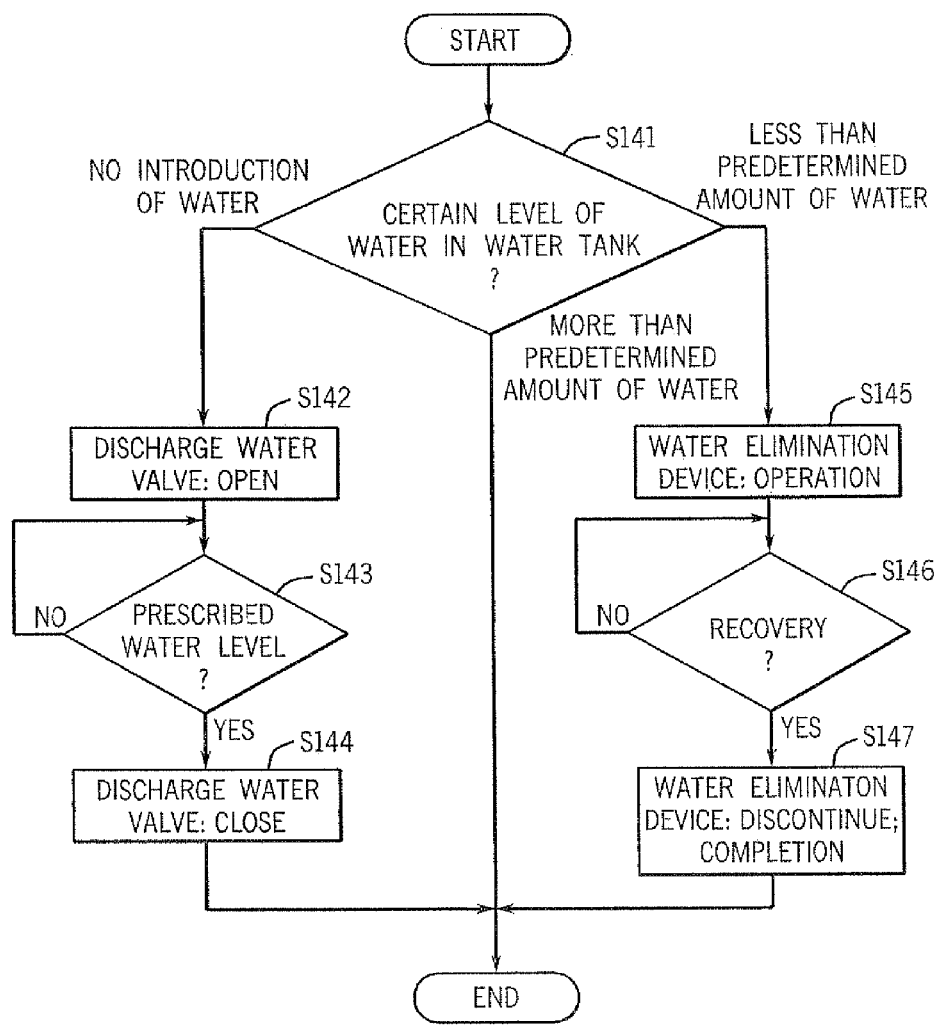
FIG. 14 is a flowchart that illustrates the control sequence of a fuel cell system related to Embodiment 12 of this invention.

FIG. 14 is a flowchart that shows the control sequence of the fuel cell system related to Embodiment 12 of this invention. The characteristics of Embodiment 12 combine the fuel cell system shown in Embodiment 11 and the water tank 113 shown in Embodiment 8. A water level detection gauge 1001 detects the water level of the tank 113. Based on the detected water level that estimates the amount of water that entered the water tank 113, water is smoothly discharged from fuel cell 100.

In FIG. 14, there is first judgment whether a certain level of water has entered into the water tank 113 from the fuel cell 100 (step S141). There are estimates for the amount of water that has been introduced and collected in the water tank 113 based on the results of measuring the fluctuations in the water level of the water tank 113, the count of the open and close operations of the discharge water valve 114, or the frequency of the liquid flowing through the discharge water pipe 1302 determined by the gas-liquid separation sensor 1305.

The water level fluctuation count is measured by the system control part 120 based on the water level that was detected by the previously described water level detection gauge 1001. In the same way, the count of the open and closed control of the discharge water valve 114 is measured by the system control part 120. The liquid determination frequency is measured by the gas-liquid separation sensor 1305 established in the discharge water pipe 1302 between the discharge water valve 114 and the confluence part 130. The gas-liquid separation sensor 1305 measures the frequency of the liquid that has flowed through the discharge water pipe 1302 using the system control part 120.

Figure 15A:
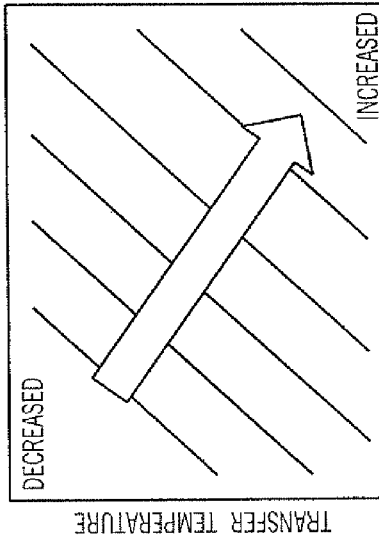
FIG. 15a is a diagram related to the water introduction amount to a tank related to Embodiment 12 of this invention.

FIGS. 15*a*-15*d* illustrate the relationships of every quantity concerning the method of estimating the introduced amount of the water in the water tank 113. As shown in FIG. 15*a*, the amount of the water introduced to the water tank 113 has a tendency to increase the required load demanded by the fuel cell system at a lower operating temperature of fuel cell 100. With respect to the required load 1307 and the operating temperature 311, when the water is approximately the same level as the introduced water amount for the slope shown in FIG. 15*a*, FIGS. 15*b*-15*d*, respectively, show the relationships for the previously described water level fluctuation count, operating count, and liquid determination frequency.

Figure 15B:
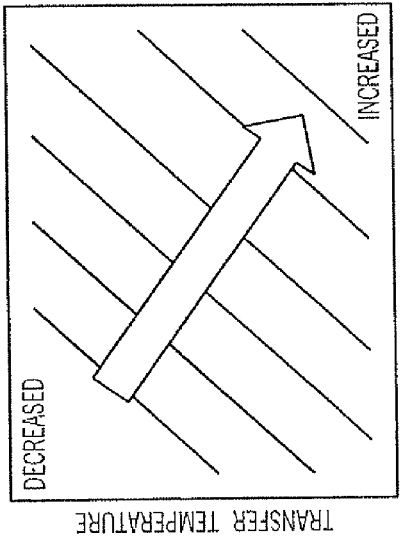
FIG. 15b is a diagram concerning a count of the water level fluctuations of a water level sensor related to Embodiment 12 of this invention.
Figure 15C:
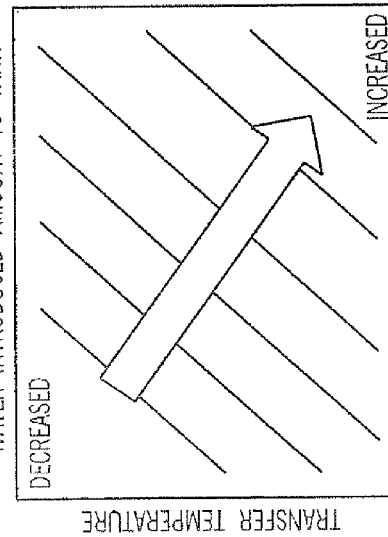
FIG. 15c is a diagram concerning the operations count of a discharge water valve related to Embodiment 12 of this invention.
Figure 15D:
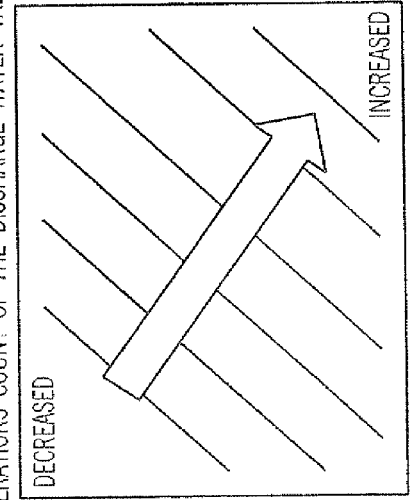
FIG. 15d is a diagram concerning the frequency of a gas-liquid separator sensor related to Embodiment 12 of this invention.

These relationships are determined by previous experiments, and are stored in a memory device within the system control part 120 in the format of, for example, maps and are used as the introduced water amount estimating system. In other words, comparing the values that are shown in FIGS. 15*b*-15*d* with the water fluctuation count, the operation count, or the liquid determination frequency measured as described above corresponding to the introduced water amount shown in FIG. 15*a* generates estimates of the introduced water amount to the water tank 113. The system control part 120 determines whether water has been introduced into the water tank 113 and whether the estimated introduced water amount is less than the specified amount that was established by previous experiments.

If the system control part 120 determines that there has been no introduction of water into the water tank 113, the discharge water valve 114 opens to release accumulated water in the water tank 113 (step S142). The discharge water valve 114 is released when the output value of water level detection gauge 1001 has reached a constant value. However when the opening of the first throttle valve 111 that discharges and controls the hydrogen gas for the water tank 113 is closed, the pressure difference between the water tank 113 and the fuel cell 100 disappears. Therefore, without the introduction of water to the water tank 113 for the fuel cell 100, there is no discharge of water that has accumulated in the water tank 113 as there has been no change in the water level of the water tank 113.

When the water is determined not to have entered the water tank 113, regardless of the water level of the water tank 113, the discharge water valve 114 opens. From this, the internal pressure of the water tank 113 is reduced and there may be introduction of water in the water tank 113 from the fuel cell 100 due to the pressure difference. At this time there is a reduction as much as possible of the internal pressure within the water tank 113. Consequently, there is established a lower limit water level for the water level detection gauge 1001, which is smaller than a pre-established value.

After the opening of the discharge water valve 114, there is determination whether or not the water level of the water tank 113 has reached the previously described water level lower limit (step S143), and if it has reached that lower limit, there is closure of the discharge water valve 114 (step S144). Moreover, the time required to close the discharge water valve 114, for example a predetermined interval, may be when the pressure within the water tank 113 reaches a prescribed value.

On the other hand, from the previous step S141, when it is determined that the water amount introduced in the water tank 113 is less than a predetermined amount, a water elimination device 1306 established between the water tank 113 and the cathode discharge pipe 107 eliminates the water retained at the first throttle valve (step S145).

In other embodiments, the first throttle valve 111 may be replaced with a variable throttle valve in the same way as used in Embodiment 6 shown in FIG. 8. The variable throttle valve is constructed as an electromagnetic valve in which the opening surface area can be varied under the control of the system control part 120 in the same way as the variable throttle valve of Embodiment 6. By using this kind of variable throttle valve when the estimated introduced water amount in the water tank 113 has been determined to be less than a predetermined amount, there is recovery of the flow surface area constricted by the accumulation of water by enlarging of the opening surface area of the variable throttle valve (step S146). Therefore, there may be an increase of the introduced water in the water tank 113 by a reduction in the internal pressure of the water tank 113, and there is cessation of control of the opening of the variable throttle valve (step S147).

It may be permissible to adopt a heating device that heats the first throttle valve under the control of the system control part 120 as a water elimination device 1306 with an electric heater. In this case, when it is determined that the estimated introduced water amount in the water tank 113 is less than a predetermined amount, there is elimination of water accumulated at the first throttle valve 111 by passing the first throttle valve 111 through an electric heater. Therefore, the flow surface area at the first throttle valve 111 is maintained, and there is a reduction in the internal pressure of the water tank 113 and an increase in the introduced water to the water tank 113.

In addition, it may also be permissible to raise the operating pressure of the fuel cell system at a water elimination device 1306. By raising the operating pressure, a greater pressure difference results before and after the throttle valves, and there is elimination of the water accumulated at the throttle parts. Hence, the amount of water introduced to the water tank 113 is increased due to a reduction in the internal pressure of the water tank 113.

From previous step S141, when the estimated introduced water amount in the water tank 113 is more than the previously described predetermined amount, the control is completed. In this way, with Embodiment 12, when it is determined that the water in the water tank 113 has not been smoothly introduced, the water is discharged from the water tank 113 and water is smoothly introduced to the water tank 113 from the fuel cell 100 by lowering the pressure of the water tank 113. Therefore, it may become possible to stably generate power with a fuel cell system in which discharge water from the fuel cell 100 is not restricted.

Moreover, in the previously described Embodiment 11 and Embodiment 12, it was possible to purge nitrogen using the anode water discharge system 115. That is, with closure of the purge valve 104, nitrogen was purged by opening the discharge water valve 114. When determining the frequency for closing the purge valve 104 based on the total amount of hydrogen discharged from the discharge water valve 114, there is established a hydrogen discharged amount that satisfies nitrogen purging performance. Therefore, it may be possible to make the discharge amount of hydrogen small. In addition, by purging with the anode water discharge system 115, it becomes possible to remove the purge valve from the fuel cell system, which reduces costs and minimizes construction. Moreover, it is permissible to appropriately combine the previously described Embodiments 1-12.

Various embodiments of the invention have been described. These and other embodiments are within the scope of the following claims.

The invention claimed is:

1. A fuel cell system comprising:
   a fuel cell that performs power generation by an electrochemical reaction of a fuel gas and an oxidant gas;
   a cathode discharge pipe connected to the fuel cell that discharges oxidant offgas generated during power generation from the fuel cell;
   an anode drain opening in the fuel cell that discharges fuel offgas and moisture generated during power generation from the fuel cell via an anode drainpipe;
   a gas-liquid separator that receives the fuel offgas and the moisture from the anode drain opening via the anode drainpipe and separates fuel gas components and moisture of the fuel offgas; and
   a throttle valve forming an opening in a flow path of the fuel offgas between the gas-liquid separator and the cathode discharge pipe wherein the throttle valve comprises an orifice connected in series with a blocking valve; and
   a controller that that operates the blocking valve to restrict a flow rate of the fuel offgas, wherein a pressure difference in the anode drainpipe causes the fuel offgas and the moisture to flow from the anode drain opening to the gas-liquid separator and the fuel offgas to flow from the gas-liquid separator to the throttle valve.

2. The fuel cell system of claim 1, wherein the throttle valve comprises a first throttle valve, the fuel cell system further comprising:
   a second throttle valve that maintains an opening in a flow path of the fuel offgas and the moisture in the anode drainpipe between the gas-liquid separator and the anode drain opening.

3. The fuel cell system of claim 2, wherein the second throttle comprises an orifice.

4. The fuel cell system of claim 1, wherein the throttle valve comprises at least one additional orifice connected in parallel with the orifice to form the opening, each of the at least one additional orifice connected in series to a respective blocking valve.

5. The fuel cell system of claim 4, further comprising:
a pressure sensor that detects an operating pressure of the fuel gas, wherein the controller adjusts the opening in the flow path of the fuel offgas between the gas-liquid separator and the cathode discharge pipe by controlling the blocking valves to open or close based on the detected pressure value.

6. The fuel cell system of claim 4, further comprising:
a current sensor that detects a current of the fuel cell; and
a temperature sensor that detects a temperature of the fuel cell, wherein the controller adjusts the opening in the flow path of the fuel offgas between the gas-liquid separator and the cathode discharge pipe by controlling the blocking valves to open or close based on the detected current and the detected temperature.

7. The fuel cell system of claim 1, further comprising:
an anode circulating system including an anode circulating pipe extending from a cathode output side of the fuel cell to an anode input side of the fuel cell and a purge pipe switchably coupled to the cathode discharge pipe; and
a fuel gas concentration sensor that detects a fuel gas concentration within the anode circulation pipe, wherein the controller adjusts the opening in the flow path of the fuel offgas between the gas-liquid separator and the cathode discharge pipe based on a required nitrogen purge amount estimated from the detected fuel gas concentration.

8. The fuel cell system of claim 4, further comprising:
a water tank that accumulates moisture from the gas-liquid separator; and
a water level sensor that detects a water level of the moisture accumulated within the water tank, wherein the controller adjusts the opening in the flow path of the fuel offgas between the gas-liquid separator and the cathode discharge pipe based on the detected water level within the water tank by controlling the blocking valves.

9. The fuel cell system of claim 1, wherein the gas-liquid separator is a first gas-liquid separator, further comprising:
an anode circulating system including an anode circulating pipe extending from a cathode output side of the fuel cell to an anode input side of the fuel cell and a purge pipe switchably coupled to the cathode discharge pipe; and
a second gas-liquid separator that separates fuel gas components and moisture within the anode circulating system.

10. The fuel cell system of claim 1, wherein the gas-liquid separator comprises a water tank that accumulates moisture from the gas-liquid separator and a confluence part that discharges moisture by merging moisture discharged from the water tank via a discharge water valve with the oxidant offgas within the cathode discharge pipe.

11. The fuel cell system of claim 1, wherein the gas-liquid separator comprises a water tank that accumulates moisture from the gas-liquid separator, the fuel cell system further comprising:
a load detection device that detects a required load of the fuel cell;
a temperature sensor that detects a temperature of the fuel cell;
a water estimation device that estimates an amount of water introduced to the water tank; and
a water elimination device that eliminates accumulated moisture at the throttle valve when the water estimation device estimates the amount of water introduced to the water tank is less than a predetermined amount of water.

12. A method of operating a fuel cell, comprising:
performing power generation by an electrochemical reaction of a fuel gas and an oxidant gas within the fuel cell;
discharging oxidant offgas generated during power generation from the fuel cell via a cathode discharge pipe;
discharging fuel offgas and moisture generated during power generation from the fuel cell to a gas-liquid separator through an anode drainpipe via an anode drain opening in the fuel cell;
separating fuel gas components and moisture of the fuel offgas with the gas-liquid separator; and
establishing a pressure difference in the anode drainpipe that causes the fuel offgas and the moisture to flow from the anode drain opening to the gas-liquid separator and the fuel offgas to flow from the gas-liquid separator to the cathode discharge pipe by controlling a blocking valve connected in series with an orifice, the blocking valve and the orifice forming a throttle valve between the gas-liquid separator and the cathode discharge pipe.

13. The method of claim 12, wherein the throttle valve comprises a first throttle valve, the method further comprising:
maintaining an opening in a flow path of the fuel offgas and the moisture in the anode drainpipe between the gas-liquid separator and the anode drain opening with a second throttle valve.

14. The method of claim 12, further comprising:
at least one additional throttle valve in parallel with the throttle valve and forming an opening with the throttle valve, each throttle valve including a respective blocking valve connected in series with a respective orifice;
detecting an operating pressure of the fuel gas with a pressure sensor; and
adjusting the opening in the flow path of the fuel offgas between the gas-liquid separator and the cathode discharge pipe based on the detected operating pressure by controlling the blocking valves.

15. The method of claim 14, further comprising:
detecting a current of the fuel cell with a current sensor;
detecting a temperature of the fuel cell with a temperature sensor; and
adjusting the opening in the flow path of the fuel offgas between the gas-liquid separator and the cathode discharge pipe based on the detected current and the detected temperature by controlling the blocking valves.

16. The method of claim 12, further comprising:
at least one additional throttle valve in parallel with the throttle valve and forming an opening with the throttle valve, each throttle valve including a respective blocking valve connected in series with a respective orifice;
estimating an amount of nitrogen to be discharged from the fuel cell via the gas-liquid separator and the throttle valves; and
adjusting the opening in the flow path of the fuel offgas between the gas-liquid separator and the cathode discharge pipe based on the estimated amount of nitrogen by controlling the blocking valves.

17. The method of claim 12, further comprising:
accumulating moisture from the gas-liquid separator in a water tank;
detecting a water level of the moisture accumulated within the water tank; and
adjusting an opening in the flow path of the fuel offgas between the gas-liquid separator and the cathode discharge pipe based on the detected water level within the water tank by controlling the blocking valve.

18. The method of claim 12, further comprising:

detecting a pressure difference within the anode drainpipe between the anode drain opening and the gas-liquid separator with a pressure detector; and adjusting an opening in the flow path of the fuel offgas between the gas-liquid separator and the cathode discharge pipe based on the detected pressure difference by controlling the blocking valve.

19. The method of claim 12, further comprising:

detecting a required load of the fuel cell with a load detection device;

detecting a temperature of the fuel cell with a temperature sensor;

estimating an amount of water introduced to the water tank based on the detected required load and the detected temperature; and discharging accumulated water within the water tank by opening the discharge water valve when there is no water being introduced in the water tank.

20. The method of claim 12, further comprising:

accumulating moisture from the gas-liquid separator in a water tank;

detecting a required load of the fuel cell with a load detection device;

detecting a temperature of the fuel cell with a temperature sensor;

estimating an amount of water introduced to the water tank; and eliminating accumulated moisture at the throttle valve with a water elimination device when the amount of water introduced to the water tank is less than a predetermined amount of water.

* * * * *